May 10, 1932.  H. ROBINSON  1,857,872
OYSTER OPENER
Filed Dec. 17, 1930  2 Sheets-Sheet 2

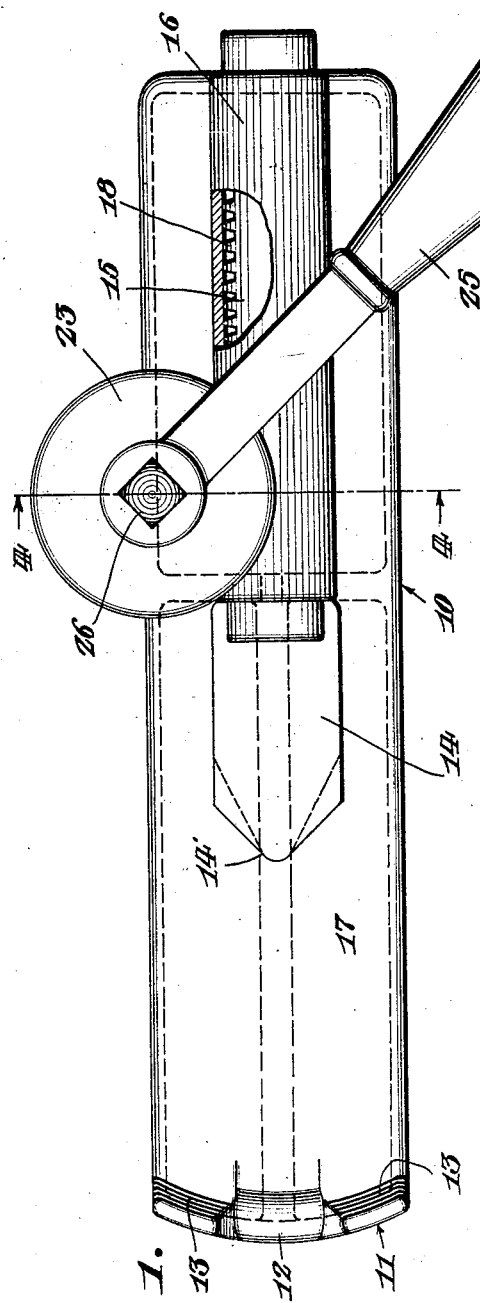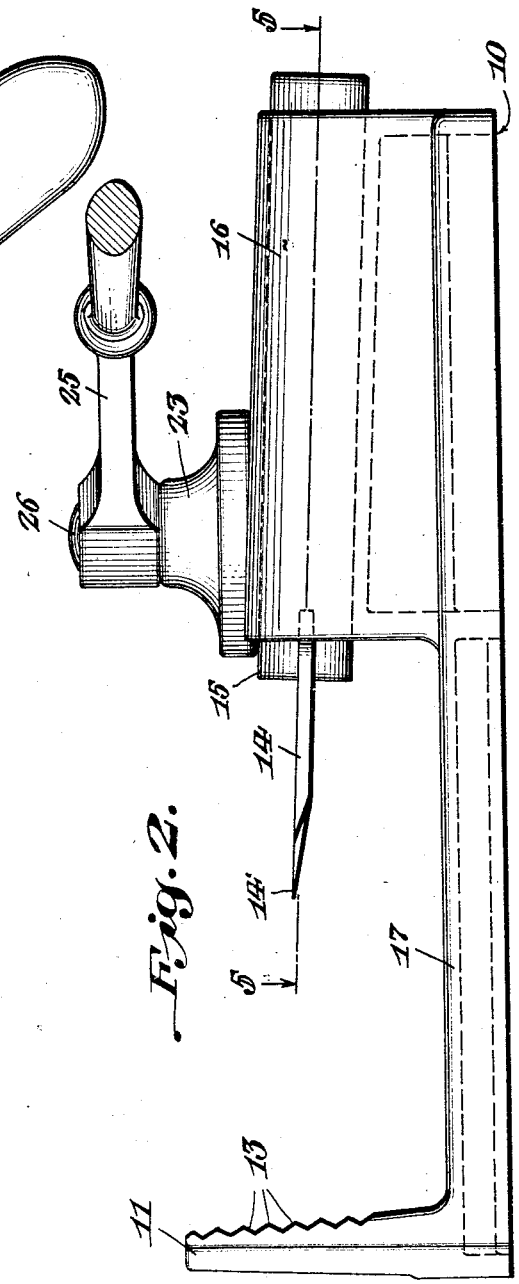

Inventor
Henry Robinson
By
Attorney

Patented May 10, 1932

1,857,872

UNITED STATES PATENT OFFICE

HENRY ROBINSON, OF NEW YORK, N. Y.

OYSTER OPENER

Application filed December 17, 1930. Serial No. 503,068.

This invention relates to an opener for bivalved mollusca, such as oysters, clams, and scallops, which will be hereinafter simply termed an oyster or oysters for simplicity.

While various means have been devised with a view to opening oysters, all of them as far as I am aware cut, tear or mutilate the meat of the oyster and so force apart and injure the shell halves that the oysters can not acceptably be served in the various forms desired for human consumption.

It is the general aim of the present invention to provide an opener which overcomes the objections mentioned and which will possess maximum practicability, enabling the oysters to be removed whole or to be separated from at least one of the shell halves merely by severing the muscle therefrom and permitting the serving thereof in a delectable manner on the other shell half.

I accomplish the object mentioned by the provision of a structure wherein the edge of the knife used travels forward and upwardly or the equivalent in an inclined plane so that said edge will follow and be in constant scraping or cutting contact with the inner surface of the upper shell half in order to efficiently sever the oyster therefrom and also wherein the compound motion upward and forward will be imparted by operation of a single element.

I also aim to provide an exceedingly sturdy, readily adaptable and yet simple construction which will have maximum endurance and be capable of manufacture at moderate cost.

The more specific objects and advantages will become apparent from a consideration of the description following taken in connection with the accompanying drawings illustrating one operative embodiment.

In said drawings:

Figure 1 is a plan view of the opener partly broken away;

Figure 2 is a side elevation of the opener;

Figure 3:
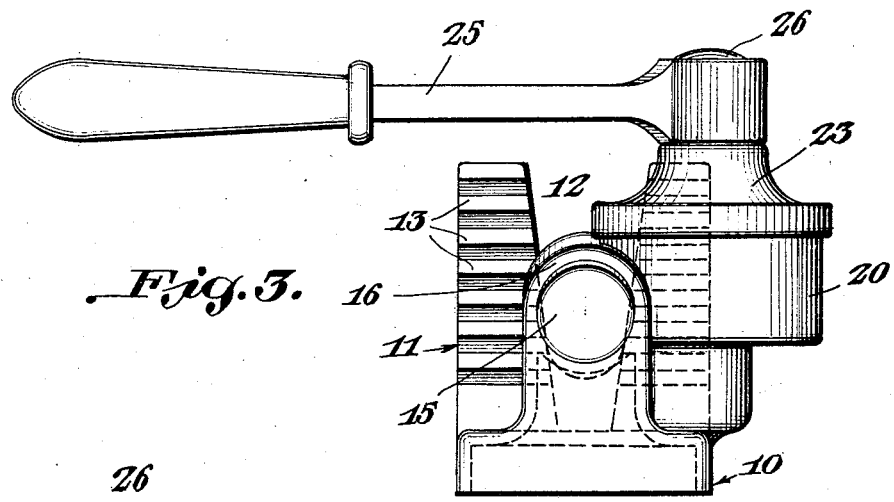
Figure 3 is an end elevation of the opener.
Figure 4:
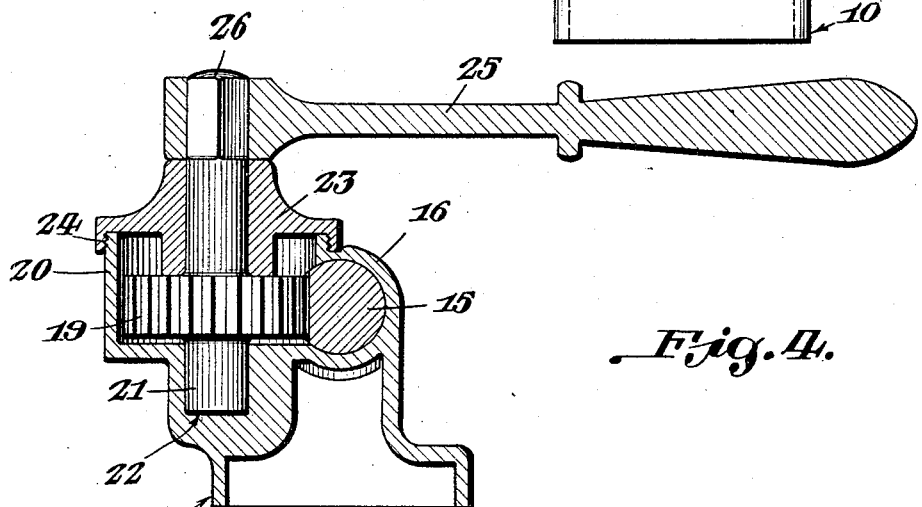
Figure 4 is a cross sectional view taken on the line 4—4 of Figure 1.
Figure 5:
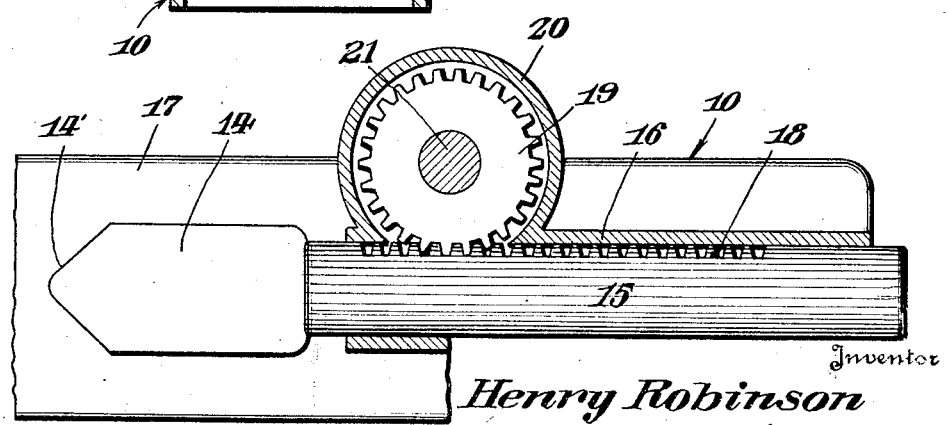
Figure 5 is a horizontal sectional view taken on the line 5—5 of Figure 2.

Referring specifically to the drawings wherein like reference characters designate like or corresponding parts, 10 designates a metallic base or bed plate which may be anchored or fastened in place in any suitable manner. An upright fixed jaw 11 is formed integral with one end of said base 10 and in order to better accommodate and hold various shaped and sizes of complete oysters, said jaw is bifurcated by the provision of a central slot 12 whose side walls diverge upwardly and the inner face of the portions of which jaw has horizontally arranged ribs, ridges or other roughened surfaces as at 13.

Opposed to the fixed jaw 11, is a knife 14 whose upper surface is preferably flat as shown, has a tapered cutting edge 14' bevelled only from the under surface. Said knife or blade 14 is carried by a plunger 15 slidably mounted in an inclined sleeve 16 integral with the base 10 and elevated with respect to an oyster supporting table of said base at 17 which is located between the sleeve and fixed jaw.

Particular attention is directed to the fact that the longitudinal axis of the plunger, knife and sleeve are at an angle to the base or supporting surface therefor, extending upwardly and forwardly toward the fixed jaw 11.

One side of said plunger 15 has rack teeth 18 which are enmeshed with the teeth of a pinion 19 located in a housing 20 formed integral with the base 10, communicating with and in laterally offset relation to the sleeve 16. Said pinion is keyed to or formed integral with a vertically disposed stub shaft 21 one end of which is journalled in a bearing socket 22 at the base of said housing. The other or upper end of stub shaft 21 is journalled in a cover member 23 for the housing. Said cover member is secured to the housing by means of screw threads or the equivalent at 24.

Above the cover member 23 is an operating crank or handle 25 secured in any desired manner to the stub shaft 21 as to a squared upper terminal 26 thereof, movement of which will readily adjust the position of the plunger and the distance of the point 14' of the knife from the wall 11 according to the size of the oysters to be opened at any one time and readjust or returned to the required convenient angular operating position. It will be realized that turning of the single handle or element 25 causes a compound movement forwardly and upwardly of the knife 14, through the medium of the pinion 19 and teeth 18 or equivalent gearing or drive means.

Presuming operation, an oyster, clam, scallop or the like is held between the thumb and forefinger of the left hand with the line of junction between the halves of its shell in substantially a horizontal plane having the hinge edge facing the knife and with the opposite edge of such shell engaging the teeth 13 of the fixed jaw. When the oyster is thus held, the other hand engages and turns the crank 25 which through the geared connection 18—19 moves the plunger 14 and knife or blade, through a single movement, in both upward and forward directions toward the oyster, cutting the hinge and entering between the halves of the shell thereof and remaining in constant cutting or scraping contact with the inner or under wall of the upper half of such shell, resulting in severing the meat of the oyster as a whole or in a single piece from the upper shell and completely detaching the upper from the lower shell. The oyster as a result is not injured and the lower shell half as a result is also intact and uninjured, thus enabling the oyster to be opened by a machine without mutilation.

Obviously the inclination of the knife 14 and associated parts could be downward and forward and deal with the lower shell of the oyster instead of the upper shell, but still attain the same advantage as set forth. Also the inclination could be to either side.

Various changes may be resorted to provided they fall within the spirit and scope of the invention.

I claim as my invention:

An opener for oysters and the like comprising a base having a table, a jaw rising therefrom, side walls in spaced relation to the jaw integral with the base and extending upwardly and inwardly therefrom, an inclined sleeve at the top of and integral with said walls, a plunger in said sleeve having rack teeth, a knife on the plunger in opposed relation to the jaw, a housing adjacent the end of the sleeve nearest the jaw, said housing being laterally offset with respect to the sleeve and integral therewith and with one of said side walls, a pinion disposed in said housing in mesh with said rack teeth, said housing having a socket in its lower wall, an operating shaft for the pinion journaled in said socket, and a cover for said housing in which the shaft is also journaled.

In testimony whereof I have affixed my signature.

HENRY ROBINSON.